March 16, 1937.  H. C. GRANT, JR  2,074,261
SUPERVISED ELECTRIC SYSTEM
Original Filed Oct. 23, 1931   2 Sheets-Sheet 2

INVENTOR
HARRY CAMPBELL GRANT, JR.
BY
J. William Carson
ATTORNEY

Patented Mar. 16, 1937

2,074,261

UNITED STATES PATENT OFFICE 2,074,261

SUPERVISED ELECTRIC SYSTEM

Harry Campbell Grant, Jr., New York, N. Y., assignor to Walter Kidde & Company, Inc., New York, N. Y., a corporation of New York Original application October 23, 1931, Serial No. 572,783. Divided and this application November 1, 1932, Serial No. 640,602

4 Claims. (Cl. 177—352)

The present invention is a division of applicant's copending application, Ser. No. 581,172, filed December 15th, 1931, for "Supervised electric systems", which is in turn a division of applicant's copending application Serial No. 572,783, filed October 23rd, 1931, which is now abandoned, and embodies that portion of the system illustrated and described in the above copending applications which relate to the general method of battery charging, battery supervision, and main supply supervision described therein. It will be apparent that the circuits embodying these particular features may have wide application and an object of the present invention, therefore, is to provide a general method of battery charging, battery supervision, and main supply supervision.

It is also an object of this invention to provide a system which can be electrically energized either by a main source of electrical potential, or by a secondary source of electrical potential normally under charge from the main source, the system likewise being capable of energization simultaneously by both of the sources of potential.

Further objects of this invention will appear as the same is described more fully in connection with the accompanying drawings wherein.

Figure 1:
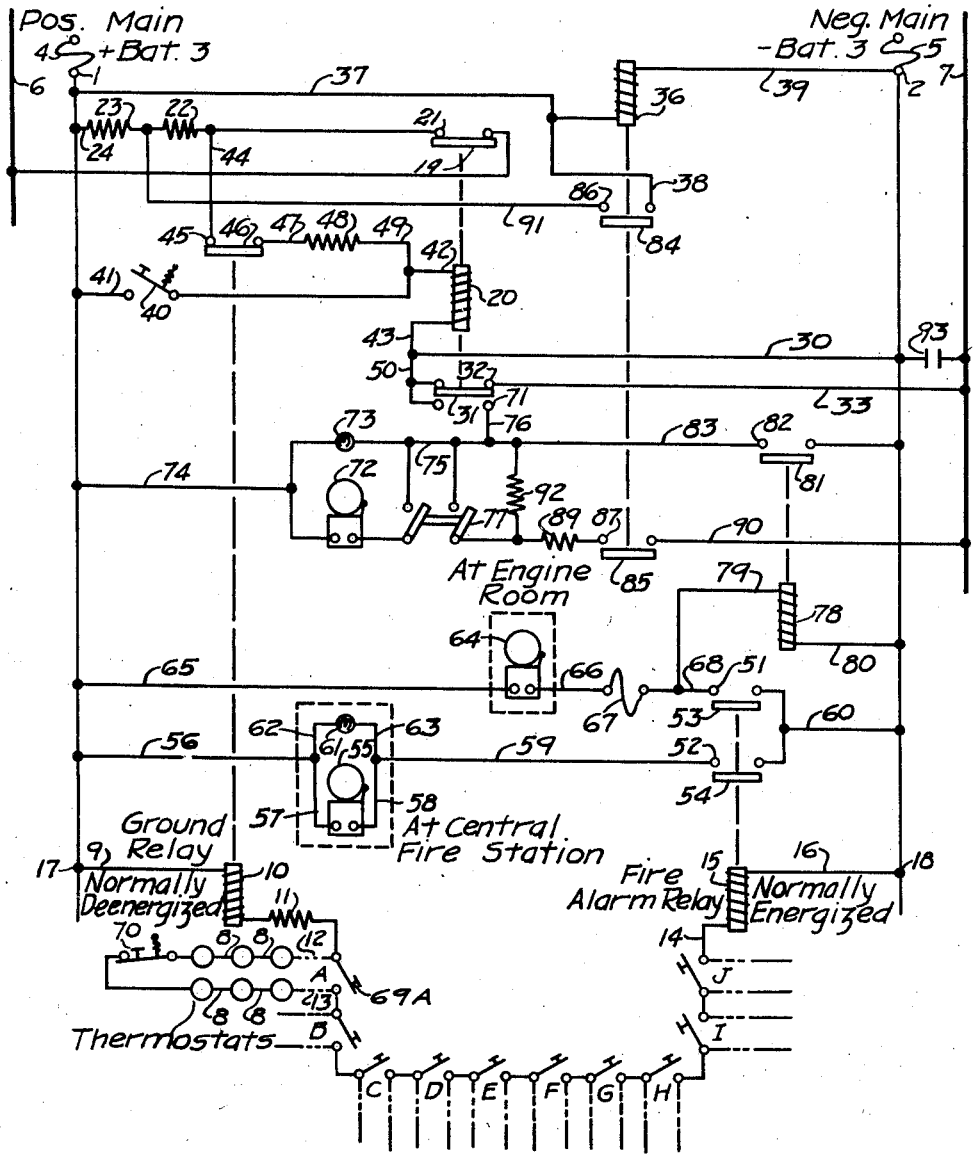
Figure 1 is a diagrammatical representation of an alarm system constructed and arranged in accordance with the invention.

At the outset, the general electric system which is supervised and energized in accordance with the present invention will be described in order that the present invention may be more fully understood and its wide application appreciated.

In the system shown the reference numerals 1 and 2 represent the positive and negative terminals of a secondary source of electrical energy in the form of a battery 3, which is protected by fuses 4 and 5 and which is normally under charge, in a manner hereinafter to be described, from a main source of electrical energy, the positive and negative terminals of which are shown at 6 and 7.

At A there are shown the terminals of a so-called "external" circuit containing normally closed circuit opening thermostats 8. B, C, D, etc., indicate the terminals of additional external circuits, all of which are connected in series in the following manner: current flowing from the positive line through the wire 9, the ground detector relay 10, the resistance 11, one side, 12, of the external circuit A, the other side, 13, of the external circuit A, then in series through the external circuits B to J inclusive, the line 14, the fire alarm relay 15 and the line 16 to the negative line.

The circuit just described and the battery 3 are connected in parallel with the main supply terminals 6 and 7, the latter normally supplying the energizing current for said circuit and the charging current for the battery, the positive and negative junction points being at 17 and 18.

The path of the charging current for the battery is from the main supply terminal 6 through the armature 19 of the main supply supervising relay 20, the contact 21, the charging resistances 22 and 23, the wire 24, through the battery, the wires 30 and 50, the armature 31, the contact 32 and the wire 33 to the main supply terminal 7.

At 36 is shown the battery supervising relay which is connected to the positive terminal of the battery by the wire 37 and to the negative terminal of the battery by the wire 39.

When a system in accordance with the present invention has been installed and is to be made ready for use, the reset switch 40 is closed, whereupon current flows from the positive terminal of the battery through the wire 41, the switch 40, the wire 42, the main supply supervising relay 20, and the wires 43 and 30 to the negative terminal of the battery. This results in energization of the main supply supervising relay 20, causing closing of the contacts 21 and 32. Upon intentional reopening of the switch 40, which is therefore preferably of the push-button type, the main supply supervising relay 20 will be found to be connected across the main supply terminals 6 and 7 through the armature 19, the contact 21, the wire 44, the contact 45, the armature 46, the wire 47, the resistance 48, and the wires 49, 42, 43 and 50, the armature 31, the contact 32 and the wire 33 thus holding the relay 20 energized.

By reason of the herein-referred to flow of current through the external circuits from the junction point 17 to the junction point 18, the fire alarm relay 15 is normally energized, but as soon as a fire occurs in a space protected by an external circuit, as for example in the space indicated by the thermostat 8 on the external circuit A, the circuit between the junction points 17 and 18 is broken by the opening of the thermostat, whereby the fire alarm relay 15 is deenergized. This results in the closing of the contacts 51 and 52 by the armatures 53 and 54, whereupon fire alarm signals are rendered in the following manner. The reference numeral 55 represents the fire alarm gong which is normally located at the central fire alarm station. This gong is sounded by reason of current flowing from the positive line through the wires 56, 57, 58 and 59, the contact 52, the armature 54 and the wire 60 to the negative line. At the same time the fire alarm lamp 61, normally located at the central fire alarm station, is illuminated by current flowing from the positive line through the wires 56, 62, 63 and 59, the contact 52, the armature 54, and the wire 60 to the negative line.

In certain types of installations, for example on board ships, it is advisable to signal the presence of fire to the engine room or some other location than the central fire alarm station, which is normally in the wheelhouse or chart room of the ship. For this purpose there is provided a second fire alarm gong 64, which becomes energized by current flowing from the positive through the wire 65, the auxiliary fire alarm gong 64, the wire 66, the fuse 67, the wire 68, the contact 51, the armature 53, and the wire 60, to the negative line.

As soon as the presence of fire is made known by any one or more of the means provided, the fire-watch attendant immediately proceeds to the central fire alarm station, at which point he will find on the operating panel a number of switches corresponding to the external circuits A to J inclusive. The switch for the external circuit A has been indicated by the reference numeral 69A. The switches for the other external circuits, although not numbered in Figure 1, will be referred to as 69B, 69C, etc. It will be noted that these switches are normally open and are so arranged as to short-circuit the external circuits when the switches are closed. The first thing the fire-watch attendant does is to start closing the switches 69A, 69B, 69C, etc. beginning with the switch 69A, and allowing the switches to remain closed until the switch is reached which causes the fire alarm gong 55 to stop sounding and the fire alarm lamp 61 to be extinguished. Since the switches 69A and 69B, etc., when closed, short-circuit the external circuits, the switch which resulted in the removal of the fire alarm signals by re-energization of the fire alarm relay 15 and the consequent re-opening of the contacts 51 and 52, is the switch which serves to indicate the presence of fire on the circuit to which it corresponds.

If it be assumed, for example, that a fire has thus been located on the external circuit H, it may happen that a fire has also occurred on one of the circuits A to G inclusive. The Fire-Watch attendant accordingly allows the switch 69H to remain closed, and then proceeds to re-open the switches 69G, 69F, 69E, etc., in the order named. If no fire has occurred on any of the external circuits A to G inclusive, all of the switches, with the exception of switch 69H, can be re-opened without further fire alarm signals, and the closed switch 69H will indicate the circuit on which the fire-watch attendant and his assistants must search for fire.

If, however, a fire has occurred on other of the circuits, the re-opening of the switch corresponding to such circuit will result in fire alarm signals, and the switch will accordingly have to be closed again so that the remainder of the circuits can be tested in like manner. It will, of course, be understood that the switches which finally remain closed serve as indications of the circuits on which fire must be looked for.

It will accordingly be seen that the single fire alarm relay 15 serves the purpose not only of instituting the fire alarm signals, but also assists directly in locating the circuit or circuits on which fire has occurred, without the need of indicating relays for each of the external circuits.

It will, of course, be understood that the occurrence of a wire break in any of the external circuits will turn in fire alarm signals, but the existence of a wire break will not become apparent until after an unsuccessful search for the presence of fire on the circuit indicated.

It has already been mentioned that the external circuits are protected against the occurrence of grounds, and the relay 10 has already been referred to as the ground detector relay, which relay is normally not energized by the relatively small supervisory current which flows through the external circuits from the junction point 17 to the junction point 18, the voltage drop across the relay 10 and the resistance 11 being only a fraction of the total drop from the junction points 17 to 18 by reason of the far greater resistance of the fire alarm relay 15 in the same series circuit.

It is customary in ship installations to have the ship's electrical circuits ground clear but this condition rarely exists. At times the ship's negative may be grounded and shortly after this the ground may be changed from negative to positive. The relative position of the ground on a ship's generator and various points of the circuit in accordance with the present invention will cause different indications to be given at the central control station.

In order to clarify the discussions which follow, let it be assumed, by way of example, that a ship has a 220 volt supply and that the battery 3 of the present invention is a 40 volt battery.

If, therefore, any one of the wires of any of the external circuits becomes grounded, while at the same time the positive side of the main power supply is normally grounded, a much greater than normal voltage is applied across the ground detector relay 10 and the resistance 11, whereupon the ground detector relay is energized and the contact at 45 is opened, the circuit for the ground current being from the positive side of the power supply 6 through the ground to the external circuits A, B, etc., thence through the resistance 11 and the ground detecting relay 10 to the positive line at the junction point 17, which is of considerably less potential than the positive side of the main power supply 6, as previously explained. The opening of the contact 45 directly interrupts the already described energizing circuit of the main supply supervising relay 20, whereupon the latter is de-energized, opening the contacts at 21 and 32, for a purpose which will appear hereinafter, and closing the contact at 71. The latter action results in the sounding of the trouble gong 72 and the illumination of the trouble lamp 73, by reason of current flowing from the positive terminal of the battery through the wire 74, then in parallel through the trouble gong 72 and the trouble lamp 73, then through the wires 75 and 76, the contact 71, the armature 31, and the wires 59 and 30 to the negative terminal of the battery. The sounding of the trouble gong 72 can be stopped by opening the switch 77, but the trouble lamp will remain illuminated.

If, on the other hand, any one of the wires of any of the external circuits should become grounded, while at the same time the negative side of the main power supply is normally grounded, the fire alarm relay 15 will be shortcidcuited, by reason of the normal connection of one side of the fire alarm relay to the negative line and the connection of the other side of the fire alarm relay to the series connection of the external circuits, whereby the full normal voltage between the junction points 17 and 18 will be applied across the ground detector relay 10 and the resistance 11, so that the ground detector relay is energized and the main supply supervising relay 20 is de-energized in the manner already described in connection with the occurrence of a ground when the positive side of the main power supply is normally grounded. In this instance the circuit for the current flowing when a negative ground occurs is from the positive line at the junction point 17, through the ground detecting relay, the resistance 11 and the external circuits, and then through the ground to the negative side of the main power supply. The already mentioned short-circuiting of the fire alarm relay 15 results in its momentary de-energization, but this relay will again be energized and the ground detector relay 10 will be de-energized when the ground is removed in the manner about to be explained.

Although it is one of the purposes of the main supply supervising relay 20 to indicate the failure of the main supply, whereby the relay would be de-energized and the trouble signals given in the manner already explained, the most important function of the relay 20 is to break the circuit between the fire alarm system and the main supply on both sides by the opening of the above mentioned contacts 21 and 32, thus removing the ground from the main circuit and allowing the battery to re-energize the fire alarm relay 15, so that dangerous currents often flowing for ground conditions will be interrupted. For this reason the relay 20 is not arranged to pick up on the main supply voltage directly, but, if de-energized, is required to be reset manually by the reset switch 40, as otherwise, upon de-energization of the relay 20 due to a ground with consequent breaking of the ground circuit, the relay 20 would be re-energized and thus bring back the ground, with the result that the relay would buzz rapidly and burn off either of the contacts 21 or 32, depending on the relative location of the grounded points.

The relay 20 has also a third function, which is best mentioned at this time, in that the breaking of the circuit between the fire alarm system and the main supply upon failure of the main supply prevents the battery from discharging back into the main supply lines, the battery now serving as the main and only source of energy.

It is to be understood that the detection of grounds in accordance with the present invention depends upon normal grounding of the positive or negative of the main source of electrical supply, either directly or through a ground resistance of a ground detector arrangement such as is sometimes employed, and which consists of two lamps connected in series with each other and across the main supply, the connection between the lamps being normally grounded, so that each of the lamps is a referred to ground resistance, and whereby grounding of either line at any point gives a ground signal by causing the extinguishing of the corresponding lamp and the brightening of the lamp corresponding to the other line.

In view of the fact that the auxiliary fire alarm gong 64 is normally located at some distance from the central fire alarm station, defects can easily occur in the external leads to the auxiliary fire alarm gong, and this gong is accordingly supervised by means of the auxiliary gong supervising relay 78, current flowing from the positive line through the external gong lead 65, the auxiliary fire alarm gong 64, the external gong lead 66, the fuse 67, the wire 79, the auxiliary gong supervising relay 78, and the wire 80 to the negative line.

If now the main supply is normally grounded on the negative side, and if a ground occurs in the external gong lead 66, the auxiliary gong supervising relay 78 will be short-circuited and consequently de-energized, whereby the armature 81 will close the contact at 82, and the trouble gong and trouble lamp will be operated by reason of current flowing from the positive line through the wire 74, the trouble gong and trouble lamp in parallel, the wire 83, the contact 82, and the armature 81 to the negative line. At the same time the auxiliary gong 64 will sound due to the cutting out of the high resistance of the supervising relay 78. If, however, a ground occurs in the external gong lead 65, such ground will constitute a direct short-circuit across the battery 3 and one of the fuses 4 and 5 will blow out, whereupon the battery supervising relay 36 will be actuated and will give the trouble signal in a manner hereinafter to be described.

If, instead of the main supply line being normally grounded on the negative side, it is normally grounded on the positive side, a ground in the external gong lead 66 will cause the auxiliary gong to sound by reason of the increased voltage to which it will be subjected, the circuit for the ground current being from the positive side of the main power supply at 6 through the ground to the external gong lead 66, and thence through the gong windings, the external gong lead 65 and the wire 56 to the positive line, which is of considerably less potential than the positive side of the main power supply 6, as already explained. On the other hand, if the external gong lead 65 becomes grounded, the increased voltage on the entire system will cause the battery supervising relay 36 to be actuated and the trouble signal given in a manner hereinafter to be described. In this instance the full potential of the positive side of the main power supply is applied to the positive line through the ground on the external gong lead 65 and the wire 56, instead of the normal battery voltage. At the same time the abnormally high charging current will cause one of the fuses 4 and 5 to blow, thus protecting the battery against excessive charge.

The external gong leads are not only protected against grounds in the manner already described, but likewise against direct short-circuits of the leads. Such a short-circuit is normally undetected, but as soon as a fire alarm signal is given, the short-circuit of the auxiliary gong leads constitutes a direct short-circuit of the battery, whereupon the fuse 67 or one of the battery fuses 4 and 5 will be blown out, and the battery supervising relay 36 will be actuated and the trouble signal given in a manner now about to be described.

While the main supply supervising relay 20 is normally energized, the battery supervising relay 36, which is connected across the terminals of the battery 3, is not actuated by the normal battery voltage, but is designed to be actuated upon a considerable increase in voltage across the relay winding.

It has already been explained that the external circuit between the junction points 17 and 18, and the battery 3, are connected in parallel across the main supply terminals 6 and 7, so that normally the main supply terminals provide the supervisory current flowing through the external circuit and the charging current flowing into the battery. When, however, a fire alarm or trouble alarm is given, the increased current required by the alarm gongs is greater than can be supplied by the main supply. The charging current normally flowing into the battery therefore reverses itself and the battery supplies the excess current required when alarm conditions arise.

If now the battery should fail for any reason, not only will the battery supervising relay 36 be actuated and give the trouble signals, but a portion of the charging resistance 22—23 will be cut out of the main supply line, so that the main supply will be capable of supplying the increased current required when alarm conditions arise.

The battery supervising relay 36 is actuated upon failure of the battery, both when the system is in its otherwise normal condition and when fire alarm or trouble alarm conditions exist. The manner in which the battery supervising relay is thus actuated will be better understood if it is kept in mind that the voltage across the relay winding is normally the same as the voltage across the battery and across the external circuit between the junctions 17 and 18. In the system herein-described, the resistance of the external circuit is considerably greater than the internal resistance of the battery, and is also somewhat greater than the value of the charging resistance 22—23. It also happens that in the system described the internal resistance of the battery is less than the value of the charging resistance 22—23. When, therefore, the battery fails for any reason with the substitution of practically infinite resistance in place of the normally small internal resistance of the battery, a considerably increased voltage drop will occur across the external circuit, due to the fact that removal of the battery charging current load will reduce the voltage drop across the charging resistance 22—23, and this increased voltage, occurring likewise across the winding of the relay 36, will cause the relay to pick up its armatures 84 and 85 and close the contacts at 86 and 87. The trouble signals will then be given by reason of current flowing from the positive line through the wire 74 and the trouble gong and trouble lamp in parallel, the wires 75 and 88, the resistance 89, the contact 87, the armature 85 and wires 90 to the main supply terminal 7. Instead, however, of the connection from the main supply terminal 6 being through the charging resistance 22—23, the increased current which the main supply is called upon to supply when the fire or trouble gongs are sounded, requires that part of the charging resistance be by-passed, and it will accordingly be found that the portion 23 of the charging resistance 22—23 is short-circuited by closing of the contact 86, the path of the short-circuit being from one side of the resistance 23 through the wires 24 and 37, the armature 84, the contact 86, and the wire 91 to the other side of the resistance 23. If now the trouble gong be stopped by opening the switch 77, additional resistance must be drawn into the circuit to protect the trouble lamp 73 and this additional resistance will be found at 92, so that the trouble lamp is energized in a series circuit including the resistances 89 and 92.

Figure 2:
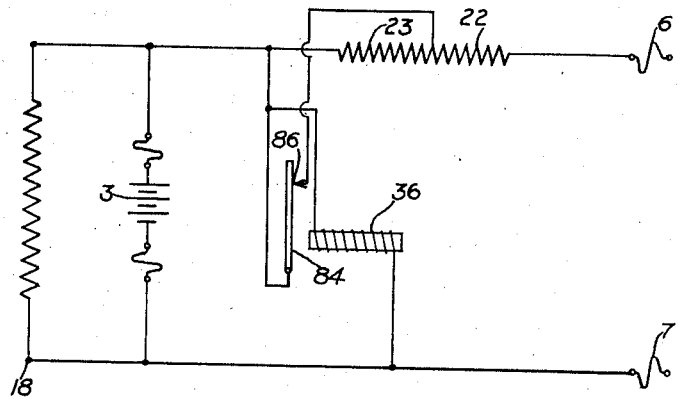
Figure 2 is a simplified diagrammatical representation of a portion of Figure 1.

The method of operation of the battery supervising relay just explained can more easily be seen in Figure 2, in which the reference numerals correspond with the reference numerals of Figure 1. Figure 2 shows the external circuit and the battery 3 normally connected in parallel across the main supply leads 6 and 7. In view of the already mentioned relationship of resistance values of the various circuit elements, a smaller voltage drop occurs across the external circuit and the battery 3 than across the charging resistance 22—23, the resistance of a parallel circuit always being less than the resistance of the smallest resistance circuit, which is the battery circuit in the present case. Failure of the battery with consequent increase in resistance approaching infinity increases the resistance of the parallel circuit to that of the external circuit, which is greater than that of the charging resistance 22—23, so that a greater voltage drop occurs across the external circuit, instead of across the charging resistance 22—23, which is the normal condition. Consequently, the battery supervising relay 36 picks up on this increased voltage and effects operations already fully described.

It must of course be understood that the main supply now furnishes current at an increased voltage across the entire fire alarm system. Consequently, the ground detector relay 10 must be so designed with respect to the fire alarm relay 15 that, except when grounds occur in the external circuits, the voltage drop across the relay 10 is only a fraction of the voltage drop between the junction points 17 and 18. If this feature is not provided for, failure of the battery with resultant increased voltage on the fire alarm system, as already described, would cause energization of the ground detector relay 10 and de-energization of the main supply supervising relay 20, with consequent cutting off of the main supply. This would mean that the system would be absolutely dead and inoperative and would give neither fire nor trouble signals.

In connection with the resistances 11 and 48, it should be noted that these are current limiting resistances and may be varied to provide adjustment of the relays 10 and 20 respectively. Also, in connection with the condenser 93, this condenser is employed to prevent arcing at the contact 32 of the main supply supervising relay 20, such as might occur when ground conditions exist.

Figure 3:
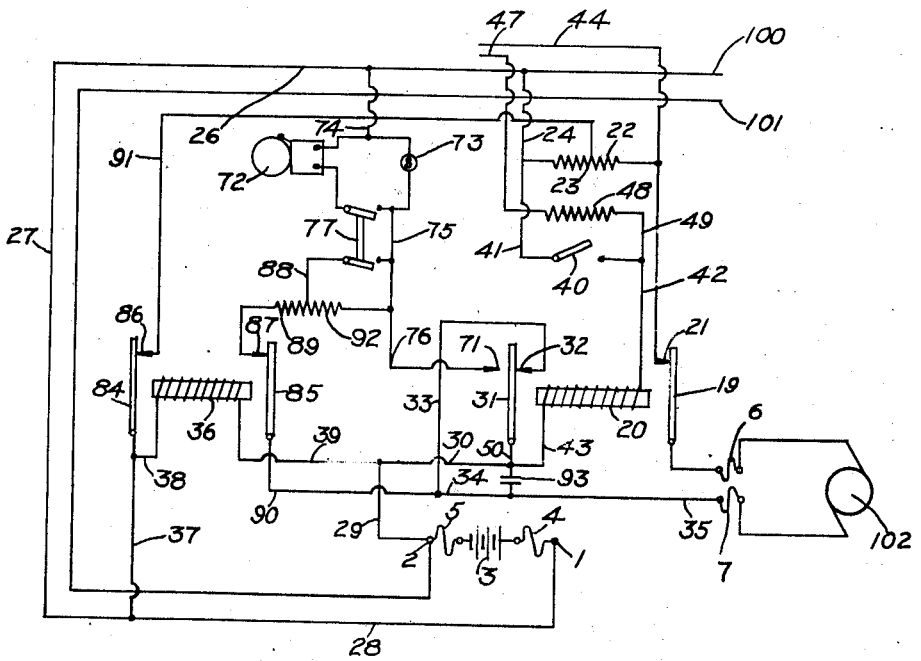
Figure 3 is a diagrammatical representation of that portion of Figure 1 which specifically relates to the present invention.

Referring now to Figure 3, in which the same reference numerals have been used as in Figure 1, it will be readily seen that the particular arrangement here shown, and embodying the present invention, is independent of the particular type of electric alarm or signaling system to be used in conjunction therewith, so that the present invention is capable of wide application in conjunction with other specific types of electric systems.

In Figure 3 the positive and negative supply leads are shown at 100 and 101 respectively. The contacts of the ground protective relay, in electric systems in which such a relay is required, are connected to the leads 47 and 44 respectively. At 102 is shown diagrammatically a main source of electrical energy.

From the foregoing description it will be apparent that I have made various improvements in electric alarm systems of the general type referred to and it is to be understood that the present invention, while it has been described with specific reference to the accompanying drawings, is not to be limited, save as defined in the appended claims.

What is claimed is:

1. In an electrical supply arrangement for use with an electric circuit, a primary source of electric potential, current limiting means in circuit between the primary source and the electric circuit, a secondary source of appreciably less electric potential than the primary source and normally under trickle charge from the primary source, and means responsive to failure of the secondary source for rendering part of the current limiting means inoperative, whereby a greater current than the trickle charge current may be supplied to the circuit from the primary source.

2. In an electrical supply arrangement for use with an electric circuit, a primary source of electric potential, a current limiting resistance in circuit between the primary source and the electric circuit, a secondary source of appreciably less electric potential than the primary source and normally under trickle charge from the primary source, and means responsive to failure of the secondary source for short-circuiting a portion of the current limiting resistance, whereby a greater current than the trickle charge current may be supplied to the circuit from the primary source.

3. In an electrical supply arrangement for use with an electric circuit, a primary source of electric potential, a current limiting resistance in circuit between the primary source and the electric circuit, a secondary source of appreciably less electric potential than the primary source and normally under trickle charge from the primary source, said secondary source having an electrical resistance smaller than that of said electric circuit, a normally inactive supervising relay connected in parallel with the secondary source and responsive to failure of the secondary source, and a normally open contact controlled by said relay and adapted to short-circuit a portion of the current limiting resistance, whereby a greater current than the trickle charge current may be supplied to the circuit from the primary source.

4. In an electrical supply arrangement for use with an electric circuit, a primary source of electric potential, a current limiting resistance in circuit between the primary source and the electric circuit, a secondary source of appreciably less electric potential than the primary source and normally under trickle charge from the primary source, an electro-responsive alarm, means responsive to failure of the primary source to disconnect the primary source from the secondary source and from the electric circuit, means operable with the means responsive to failure of the primary source to effect operation of said electro-responsive alarm, means responsive to failure of the secondary source for short-circuiting a portion of the current limiting resistance, whereby a greater current than the trickle charge current may be supplied to the circuit from the primary source, means operable with the means responsive to failure of the secondary source to effect operation of said electro-responsive alarm including a connection to the electro-responsive alarm, and means to prevent injury to said electro-responsive alarm by the increased potential resulting when the secondary source fails comprising a current limiting resistance in the aforesaid connection, said last named current limiting resistance functioning only when the electro-responsive alarm operates to indicate failure of the secondary source.

HARRY CAMPBELL GRANT, Jr.